US009124170B2

(12) United States Patent
Gu et al.

(10) Patent No.: US 9,124,170 B2
(45) Date of Patent: Sep. 1, 2015

(54) POWER FACTOR CORRECTION DEVICE, AND CONTROLLER AND THD ATTENUATOR USED BY SAME

(75) Inventors: Wenhao Gu, Guangdong (CN); Runqin Tan, Guangdong (CN); Lifang Guo, Guangdong (CN)

(73) Assignee: FREMONT MICRO DEVICES (SHENZHEN) LIMITED, Shenzhen (CN)

( * ) Notice: Subject to any disclaimer, the term of this patent is extended or adjusted under 35 U.S.C. 154(b) by 254 days.

(21) Appl. No.: 13/878,757

(22) PCT Filed: Oct. 11, 2011

(86) PCT No.: PCT/CN2011/080630
§ 371 (c)(1),
(2), (4) Date: Apr. 11, 2013

(87) PCT Pub. No.: WO2012/048630
PCT Pub. Date: Apr. 19, 2012

(65) Prior Publication Data
US 2013/0201731 A1 Aug. 8, 2013

(30) Foreign Application Priority Data

Oct. 11, 2010 (CN) .......................... 2010 1 0501504

(51) Int. Cl.
*H02M 1/12* (2006.01)
*H02M 1/42* (2007.01)
*H02M 3/335* (2006.01)

(52) U.S. Cl.
CPC .............. *H02M 1/12* (2013.01); *H02M 1/4225* (2013.01); *H02M 3/33507* (2013.01); *Y02B 70/126* (2013.01)

(58) Field of Classification Search
CPC ........ H02M 1/12; H02M 1/42; H02M 1/4225
USPC ....................... 323/207, 222, 283; 363/39–48
See application file for complete search history.

(56) References Cited

U.S. PATENT DOCUMENTS

| 5,568,041 A * | 10/1996 | Hesterman .................... 323/207 |
| 6,104,172 A * | 8/2000 | Josephs et al. ................ 323/222 |
| 7,180,273 B2 * | 2/2007 | Bocchiola et al. ............ 323/207 |

(Continued)

FOREIGN PATENT DOCUMENTS

| CN | 101282079 A | 10/2008 |
| CN | 101854116 A | 10/2010 |

OTHER PUBLICATIONS

International Search Report of the PCT Application No. PCT/CN2011/080630.

*Primary Examiner* — Matthew Nguyen
*Assistant Examiner* — Kyle J Moody (57) ABSTRACT

A power factor correction device, and a controller and a total harmonic distortion (THD) attenuator used by same. The power factor correction device comprises a converter and a controller (320) connected to the converter to obtain an input voltage. The controller (320) comprises a THD attenuator (407) for automatic THD optimization. The converter comprises an input current detection resistor (3R8), a power switch tube (3NMOS) and an output circuit. The input current detection resistor (3R8), the power switch tube (3NMOS) and the output circuit form a feedback control loop to maintain a constant output voltage. A THD optimization function is built in the device so that the entire device is capable of being accurately offset to a designed voltage so as to be used for THD optimization, thereby dispensing with external manual adjustment and overcoming internal technical deviations while achieving high consistency.

4 Claims, 7 Drawing Sheets

(56) References Cited

U.S. PATENT DOCUMENTS

| | | | |
|---|---|---|---|
| 7,514,912 B2 * | 4/2009 | Shao et al. | 323/285 |
| 8,787,045 B1 * | 7/2014 | Hung et al. | 363/39 |
| 8,917,076 B2 * | 12/2014 | Hsing et al. | 323/284 |
| 2010/0246226 A1 * | 9/2010 | Ku et al. | 363/126 |

* cited by examiner

Present Application

Fig.7b

POWER FACTOR CORRECTION DEVICE, AND CONTROLLER AND THD ATTENUATOR USED BY SAME

FIELD OF THE INVENTION

The present invention relates to power factor correction (PFC) technology, and more particularly, to a power factor correction device, and a controller and a total harmonic distortion (THD) reducer used in the same.

BACKGROUND OF THE INVENTION

The increasing demand of active power factor devices (APFD) is driven by the concern for the quality of the power line supplies. Injection of high harmonics into the power line is well-known to cause many problems. Among these are the lower efficiency of power transmission, possible interference to other units connected to the power line, and distortion of the voltage shape that is undesirable. In addition to resolve these issues, APFD offers another advantage to increase the power level that can be drawn from the power line.

One of the main contributors of total harmonic distortion (THD) in active power factor correction system (APFCS) is the so-called "crossover distortion". The root cause of the crossover distortion is due to the residual voltage across the capacitor 1C1 after the bridge rectifier. This residual voltage blocks the current flowing from bridge rectifier as long as the absolute AC voltage is lower than the summation of residual voltage and offset voltage of the bridge diode 1BD1. During this blocking period, APFCS is equivalent to non power factor correction system. The magnitude of the residual voltage is depend on the capacitance of the total parasitic capacitor at the drain 106 of power switch tube 1NMOS (refer to FIG. 1), inductance of a boost inductor 121, AC voltage and output load 1RL.

Figure 1:
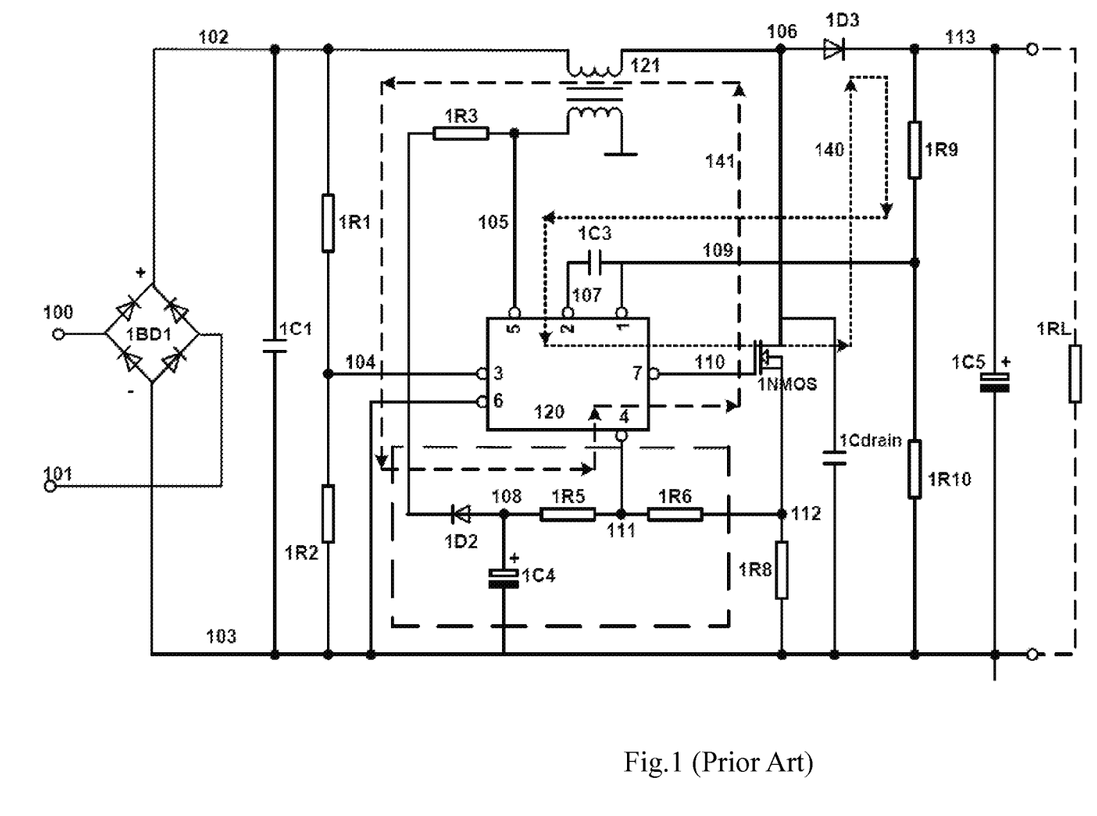
FIG. 1 is a circuit schematic of a prior art active power factor correction device for minimizing crossover distortion.

FIG. 1 shows the prior art of the active power factor correction system for minimizing the crossover distortion. Controller 120 receives feedback signals through the various lines 104, 111, 109, 105. Signal 104 is a rectified voltage derived from a voltage divider comprised of resistors 1R1 and 1R2, and its waveform pattern is used as the reference for the desired shape of the input current. Signal 111 is the summation of boost inductor current sense signals 112 and 108 from crossover distortion reducer (CDR). The signal 112 serves to sense current flow through boost inductor 121 by sensing the voltage drop across the inductive resistor R8. Negative voltage at node 108 generated from CDR is proportional to the rectified main voltage and the turn ratio of the auxiliary winding of the boost inductor 121. Symbol 109 represents a scale down boosted output signal at node 113 from the voltage divider consisting of the resistors 1R9 and 1R10. Signal 105 obtained with an auxiliary winding on the boost inductor 121 serves to monitor the zero voltage crossing the boost inductor 121. Controller 120 is then based on these feedback signals to generate output signal at node 110 which defines the on-off switching period of the power switch tube 1NMOS. Capacitor 1Cdrain is the equivalent parasitic capacitance connected between the node 106 and ground.

Figure 2:
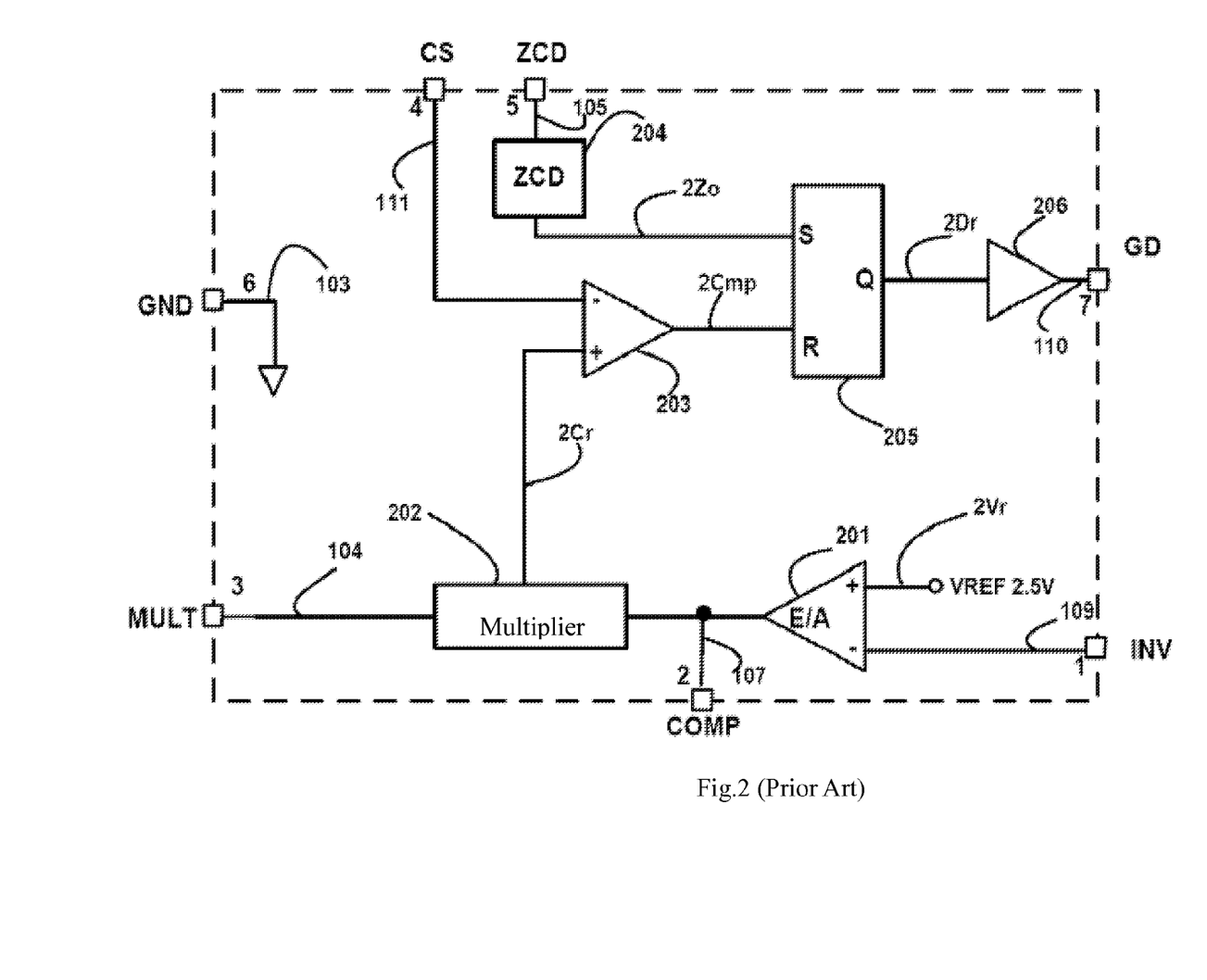
FIG. 2 is a functional block diagram of a prior art PFC controller.

A detail functional block diagram of controller 120 which is designed to maintain the output voltage at node 113 constant by feedback control is shown in FIG. 2. It is consist of an error amplifier 201, multiplier 202, comparator 203, zero crossing detector 204, RS flip-flop register 205 and gate driver 206. The error amplifier receives signal from node 109 or pin 1 which is compared with build-in reference voltage, for example 2.5V, to generate an error signal at node 107 or pin 2. The multiplier 202 serves to multiply the error signal with the scale-down rectified signal at node 104 or pin 3 and to produce a rectified sinusoidal reference signal 2Cr. Comparator 203 compares the rectified sinusoidal reference signal 2Cr with signal received at node 111 or pin 4 from the CDR to create a logic signal for power switch tube 1NMOS off control. Signal from node 105 or pin 5 is monitored by zero crossing detector 204. At the time when a positive to negative voltage event or so-called "zero crossing" occurs, a logic high signal is generated from zero crossing detector 204 to set RS flip-flop register 205 that turns to switch on power switch tube 1NMOS. The boost inductor current and its sense signal voltage at node 111 or pin 4 starts to rise at the time of the power switch tube 1NMOS on. When the sense signal voltage rises up to equal to the rectified sinusoidal reference signal 2Cr, a reset signal is produced from comparator 203 to reset the RS flip-flop register 205 that turns to switch off the power switch tube 1NMOS. The power switch tube 1NMOS stays off until next "zero crossing" event and the on-off switching cycle for switch tube starts over again.

The main concept of this prior art implementation is to fully discharge capacitor 1C1 at zero crossing of AC voltage. This can be done by artificially increasing the on-time of the power switch tube 1NMOS with a negative offset on the current sense input pin 4 of controller 120 at node 111. The negative offset voltage is introduced by CDR and its operation principle is described below:

During the on-time period of power switch tube 1NMOS, voltage across the auxiliary winding 121 is negative that forward bias diode 1D2 to charge the capacitor 1C4. A negative voltage which is proportional to RMS value of voltage and the turn ratio of the auxiliary winding 121 is maintained by capacitor 1C4. This negative voltage turns to extend the on-time of power switch tube 1NMOS through a voltage divider consisting of resistors 1R6 and 1R5, which generates a control signal at node 111 and presents to controller 120 by pin 4.

A major drawback of the prior art design is the need of manual adjustment on the resistance value of resistor 1R6 to find the optimum solution due to the inconsistent compensation voltage resulting from process variations between different ICs, external components and internal modules, which is not propitious to large scale production, increases system components for adding an outer power factor correction device, and as a result increases costs.

Accordingly, a power factor correction device requiring no manual adjustment, overcoming process variations and processing high consistency is desired.

SUMMARY OF THE INVENTION

The objective of this invention is to provide a power factor correction device requiring no manual adjustment, overcoming process variations and processing high consistency aiming at above defects in the prior art.

In one aspect, the power factor correction device according with the present invention comprises a converter and a controller coupled to the converter to obtain an input voltage, wherein, the controller comprises a THD reducer capable of achieving an automatic THD optimization, the converter comprises an input current sense resistor, a power switch tube and an output circuit, wherein, the input current sense resistor, power switch tube and output circuit form a feedback control loop to maintain a constant output voltage level.

Advantageously, the converter further comprises a bridge rectifier connected to an AC voltage to have a rectified sinusoidal voltage, and a rectified main voltage divider connected to the bridge rectifier to scale down the rectified sinusoidal voltage such that a scale-down rectified sinusoidal voltage is provided to the controller.

Advantageously, the output circuit comprises an output diode, an output voltage divider and an output filtering capacitor, wherein, an anode of the output diode is connected to a drain of the power switch tube, and a cathode of the output diode is connected to the output voltage divider to scale down an output voltage and provide a scale-down output voltage to the controller, and the output filtering capacitor is connected with the output voltage divider in parallel to filter high frequency components of a switching ripple voltage and store an DC output voltage.

Advantageously, the converter further comprises a first capacitor and a boost inductor. The first capacitor is connected with the rectified main voltage divider in parallel to filter high frequency components of the rectified sinusoidal voltage. The boost inductor has an auxiliary winding with a first terminal connected the controller and a second terminal grounded, and a primary winding with a first terminal connected an output end of the bridge rectifier, and a second terminal connected the drain of the power switch tube.

Advantageously, the controller comprises:

an error amplifier for generating a voltage error signal corresponding to a deviation between the scale-down output voltage and a predetermined reference voltage;

a multiplier for multiplying the scale-down rectified sinusoidal voltage with the voltage error signal to generate a sinusoidal reference signal;

a comparator for generating a logic signal for setting the power switch tube on period by comparing a received current sense signal received by the input current sense resistor with the sinusoidal reference signal;

a zero crossing detector for generating an edge logic signal to turn on the power switch tube;

a RS flip-flop register and a gate driver combined to create a required analog waveform pattern for driving the power switch tube and thereby approximating the shape of the current running through the boost inductor to the sinusoidal waveform of the rectified sinusoidal voltage;

a THD reducer for setting a THD optimization set offset voltage never changing with process variations via feedback control so as to minimize residual charges on the first capacitor at a valley of the rectified sinusoidal voltage.

Advantageously, the THD reducer further comprises:

a sampling module for sampling an output detuning voltage signal when the multiplier receives a zero input;

a double direction offset compensation voltage generating module for receiving two opposite voltage signals generated by a logic control module to generate a double direction offset voltage signal;

a comparator for generating a logic signal by comparing a summation of the output detuning voltage signal from the sampling module and the double direction offset voltage signal with the THD optimization set offset voltage; and the logic control module for receiving the logic signal outputted by the comparator to generate the two opposite voltage signals.

Advantageously, the double direction offset compensation voltage generating module further comprises a voltage-controlled voltage source, a current source, a current sink and a second capacitor, wherein, the current source and the current sink are connected in series, the second capacitor and the current sink are connected in parallel. Wherein, the two opposite voltage signals control the current source and the current sink to charge or discharge the second capacitor for generating an offset voltage signal. The voltage-controlled voltage source receives the offset voltage signal and a fixed voltage signal to generate the double direction offset voltage signal.

In other aspect, a controller capable of obtaining an automatic THD optimization used by a power factor correction device according with the present invention comprises:

an error amplifier for generating a voltage error signal corresponding to a deviation between a scale-down output voltage and a predetermined reference voltage;

a multiplier for combining a scale-down rectified sinusoidal voltage with the voltage error signal to generate a sinusoidal reference signal;

a comparator for generating a logic signal for setting a power switch tube on period by comparing a received current sense signal received by an input current sense resistor with the sinusoidal reference signal;

a zero crossing detector for generating an edge logic signal to turn on the power switch tube;

a RS flip-flop register and a gate driver combined to create a required analog waveform pattern for driving the power switch tube and thereby approximating the shape of the current running through a boost inductor to the sinusoidal waveform of the rectified sinusoidal voltage;

a THD reducer for setting a THD optimization set offset voltage never changing with process variations via feedback control so as to minimize residual charges on a first capacitor at a valley of the rectified sinusoidal voltage.

One skilled in the art knows that the controller adapts to the preceding power factor correction device.

Advantageously, the THD reducer further comprises:

a sampling module for sampling an output detuning voltage signal when the multiplier receives a zero input;

a double direction offset compensation voltage generating module for receiving two opposite voltage signals generated by a logic control module to generate a double direction offset voltage signal;

a comparator for generating a logic signal by comparing a summation of the output detuning voltage signal from the sampling module and the double direction offset voltage signal with the THD optimization set offset voltage; and the logic control module for receiving the logic signal outputted by the comparator to generate the two opposite voltage signals.

In another aspect, a THD reducer capable of obtaining an automatic THD optimization used by a power factor correction device according with the present invention comprises:

a sampling module for sampling an output detuning voltage signal when a multiplier receives a zero input;

a double direction offset compensation voltage generating module for receiving two opposite voltage signals generated by a logic control module to generate a double direction offset voltage signal;

a comparator for generating a logic signal by comparing a summation of the output detuning voltage signal from the sampling module and the double direction offset voltage signal with a THD optimization set offset voltage; and the logic control module for receiving the logic signal outputted by the comparator to generate the two opposite voltage signals.

One skilled in the art knows that the THD reducer adapts to the preceding controller and power factor correction device.

BRIEF DESCRIPTION OF THE DRAWINGS

So as to further explain the invention, an exemplary embodiment of the present invention will be described with reference to the below drawings, wherein.

DETAILED DESCRIPTION OF THE PREFERRED EMBODIMENT

These and other advantage, aspect and novel features of the present invention, as well as details of an illustrated embodiment thereof, will be more fully understand from the following description and drawings. Various embodiments of the present invention have only been presented by way of example instead of limitation.

A device equipped with an automatic THD optimization function for the correction of the power factor in an AC-DC power converter is proposed. It is an innovative solution for resolving crossover distortion problem in Active Power Factor Correction AC-DC Converter System (APFCS) without the need of manual adjustment on CDR resistor value R6 (FIG. 1) for THD optimization like the prior art described in the FIG. 1. The built-in THD optimization function enable the system precisely offsetting to the designed voltage for THD optimization without external manual adjustment, overcoming internal process variations, and obtaining high consistency. The operation principle of the device and method is described as following.

Figure 3:
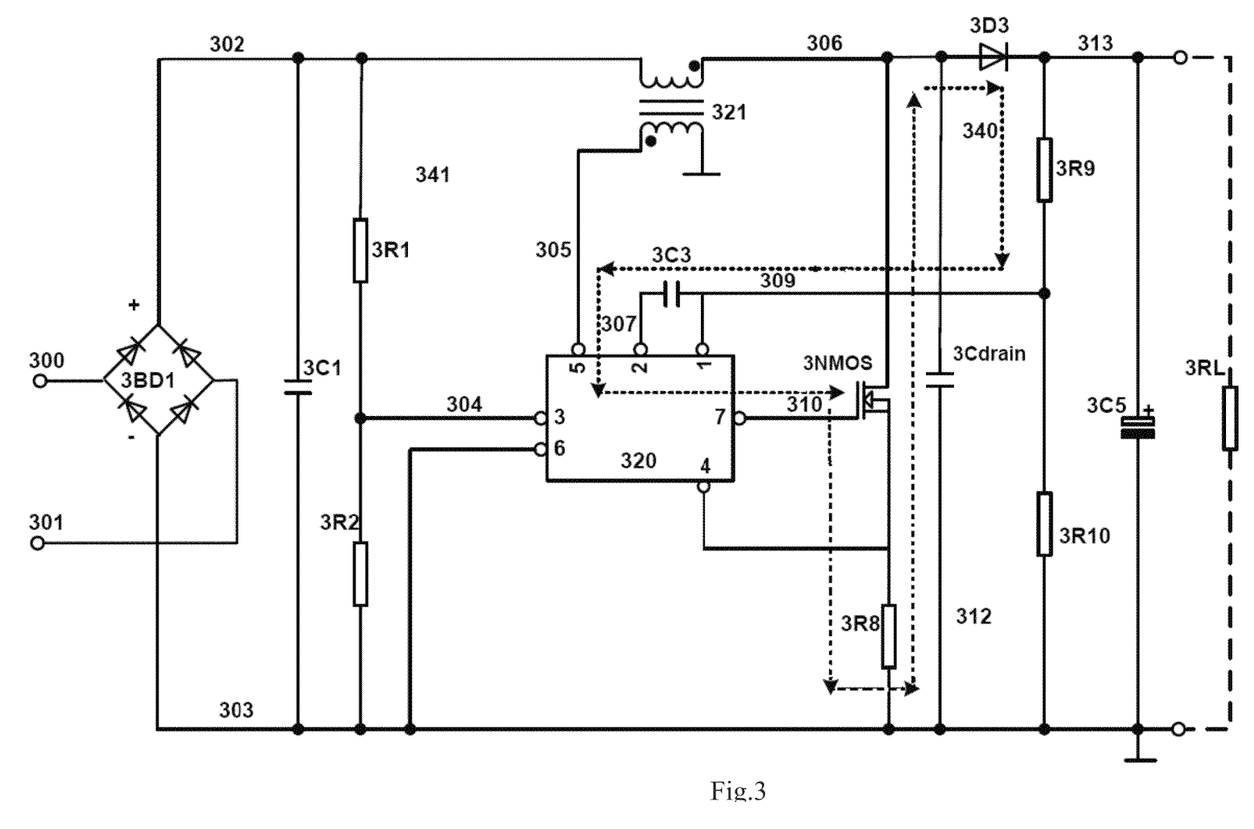
FIG. 3 is a functional block diagram of a power factor correction device according to present invention.
Figure 4:
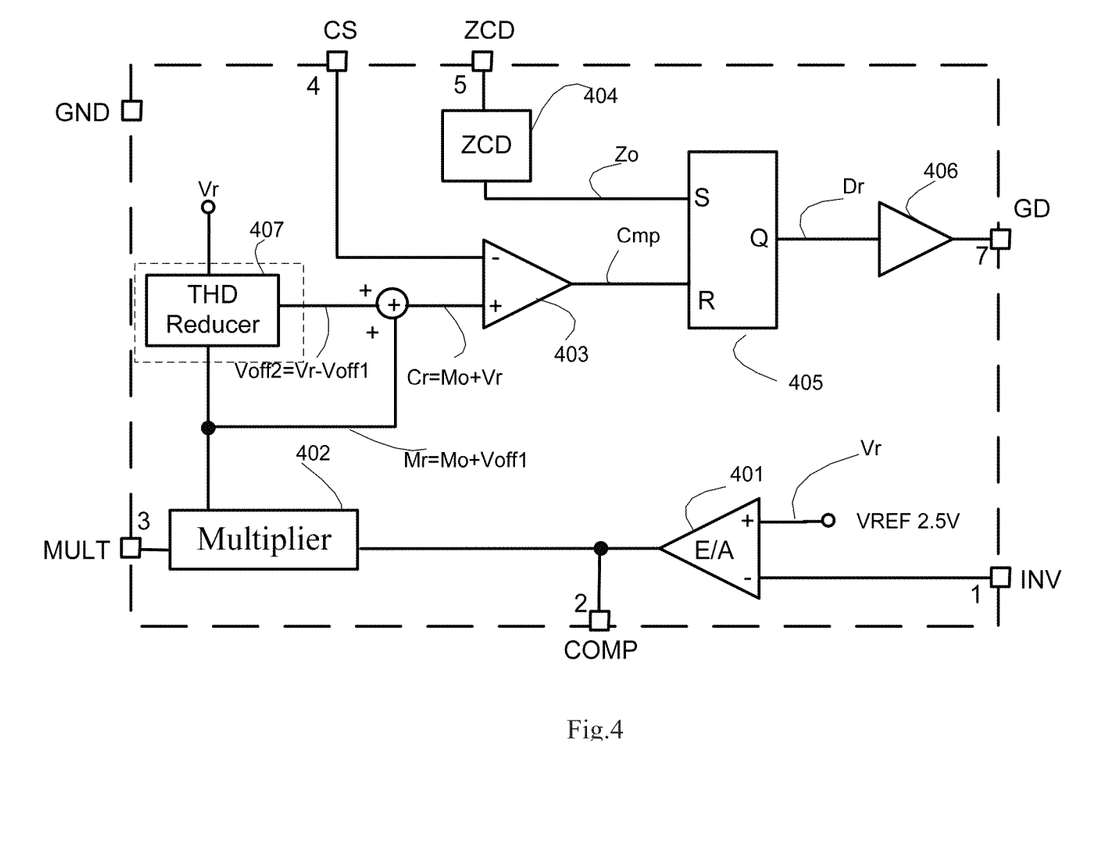
FIG. 4 is a functional block diagram of a PFC controller with a built-in THD reducer according to present invention.

FIG. 3 illustrates a functional block diagram for APFCS in the present invention, wherein a functional block diagram of its controller 320 is shown in FIG. 4. This device consists of bridge rectifier 3BD1, filter capacitor 3C1, rectified main voltage divider consisting of resistors 3R1 and 3R2, boost inductor 321, controller 320, power switch tube 3NMOS, inductor current sense resistor 3R8, output diode 3D3, output capacitor 3C5, output voltage divider consisting of resistors 3R9 and 3R10, and an equivalent parasitic capacitor 3Cdrain connected between the node 306 and ground. As the auto THD optimization is a built-in function in controller 320, crossover distortion reducer circuit shown in FIG. 1 is no longer required in this embodiment.

The AC voltage is rectified by the bridge rectifier 3BD1 to have a rectified sinusoidal voltage at node 302. Filter capacitor 3C1 connected at the output end of the bridge rectifier 3BD1 is used to filter the high frequency components of the rectified sinusoidal voltage. Rectified main voltage divider consisting of resistors 3R1 and 3R2 connected in parallel with the filter capacitor 3C1 is to scale down rectified sinusoidal voltage such that the scale-down voltage can be used by controller 320 at pin 3. The boost inductor 321 has a primary winding with one terminal connected an output end of the bridge rectifier 3BD1, and the other terminal connected the drain of the power switch tube 3NMOS, and further has an auxiliary winding with one terminal connected the controller 320 at pin 5 and the other terminal grounded. The power switch tube 3NMOS has its gate connect the controller 320 at pin 7, its source connect the controller 320 at pin 4 and grounded via inductor current sense resistor 3R8. An anode of the output diode 3D3 is connected to a drain of the power switch tube 3NMOS, and a cathode of the output diode 3D3 is connected to the output voltage divider consisting of resistors 3R9 and 3R10. The capacitor 3C3 is connected between the pins 1 and 2 of the controller 320, while the controller 320 has its pin 1 connected at the middle of resistors 3R9 and 3R10. The pin 6 of the controller 320 is grounded. The power switch tube 3NMOS and boost inductor 321 with auxiliary winding form a high frequency boost converter. Energy is stored in the boost inductor 312 when power switch tube 3NMOS is on and energy is released from the boost inductor 321 transferring to the output capacitor 3C5 and the load 3RL when power switch tube 3NMOS is off The output capacitor 3C5 is used to filter out the high frequency contents of switching ripple voltage and store the DC output voltage.

Constant DC output voltage level at node 313 is maintained by DC output feedback control loop 340 formed by power switch tube 3NMOS, output diode 3D3, inductor current sense resistor 3R8, output voltage divider consisting of resistors 3R9 and 3R10, error amplifier 401 in controller 320, multiplier 402, comparator 403, zero crossing detector (ZCD) 404, RS flip-flop register 405, and gate driver 406 (FIG. 4). Its operation principle is described as following:

The error amplifier 401 receives a signal from pin 1 which is compared with build-in reference voltage VREF, for example 2.5V, to generate an error signal 307 at pin 2. The multiplier 402 serves to multiply the error signal 307 received from error amplifier 401 with the scale-down rectified sinusoidal voltage 304 induced by resistors 3R1 and 3R2 of rectified main voltage divider at pin 3 to produce a sinusoidal reference signal 4Mo which is proportional to RMS value of the AC voltage and the error signal 307 at pin 2. As the multiplier has a complicated circuit which is seriously affected by the process variations and matching detuning, it output a detuning voltage Voff1 of uncertain value rather than zero when receiving a zero input. Accordingly, the multiplier 402 should output Mo+Voff1. THD reducer 407 samples output error Voff1 of multiplier 402 when the multiplier 402 receives a zero input, and outputs a signal Voff2. It is mentioned Voff2=Vr−Voff1, wherein, Vr is a fixed value independent of temperature (such as 33 mV). A summation Mo+Vr of the output Vof from THD reducer 407 and the output Mo+Voff1 from multiplier 402 forms the sinusoidal current reference signal of comparator 403. The comparator 403 compares the sinusoidal current reference signal with a signal from pin 4 to generate a logic signal for switching off the power switch tube 3NMOS. Signal from pin 5 is monitored by zero crossing detector 405. At the time when a positive to negative voltage event or so-called "zero crossing" is detected at pin 5, a logic high signal is generated from zero crossing detector 405 to set RS flip-flop register 405 that turns to switch on power switch tube 3NMOS. The boost inductor current and its sense signal 312 at pin 4 start to rise at the time of the power switch tube 3NMOS on. When the sense signal 312 rises up to sinusoidal current reference signal Mo+Vr, a reset signal is produced from comparator 403 to reset the RS flip-flop register 405 that turns to switch off power switch tube 3NMOS. The power switch tube 3NMOS stays off until next "zero crossing" event and the switch on-off cycle for switch tube starts again. At steady state, the voltage level of error signal 307 and the on-off switching period of power switch tube 3NMOS are determined by the input AC voltage and output load 3RL.

THD optimization can be achieved by adding an appropriate offset voltage signal any where around the DC output feedback control loop 340 such that the added offset voltage forces current to pass through boost inductor when AC voltage is near zero voltage point, and thereby the residual voltage across 3C1 is reduced close to zero for achieving system THD optimization.

Figure 5:
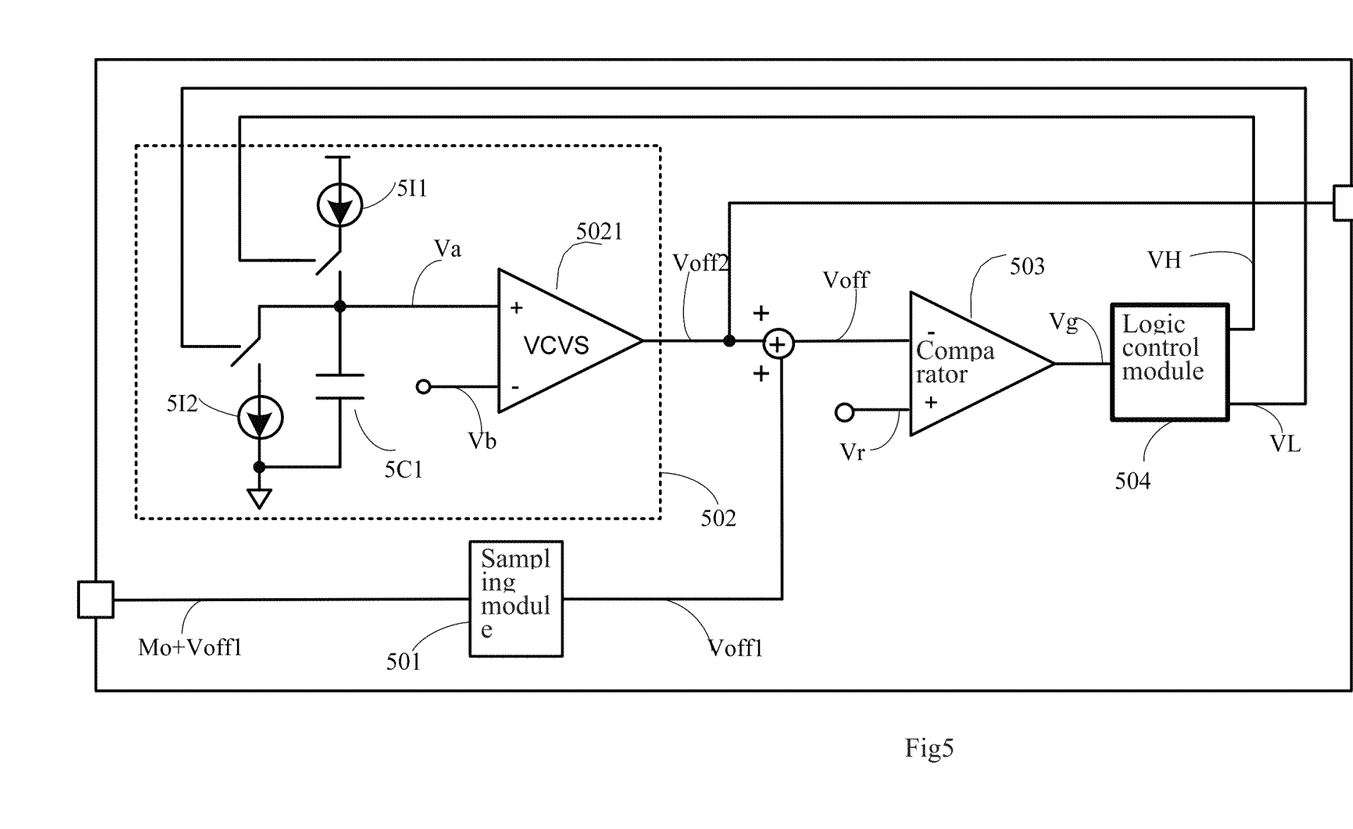
FIG. 5 is a functional block diagram of a THD reducer according to present invention.
Figure 6:
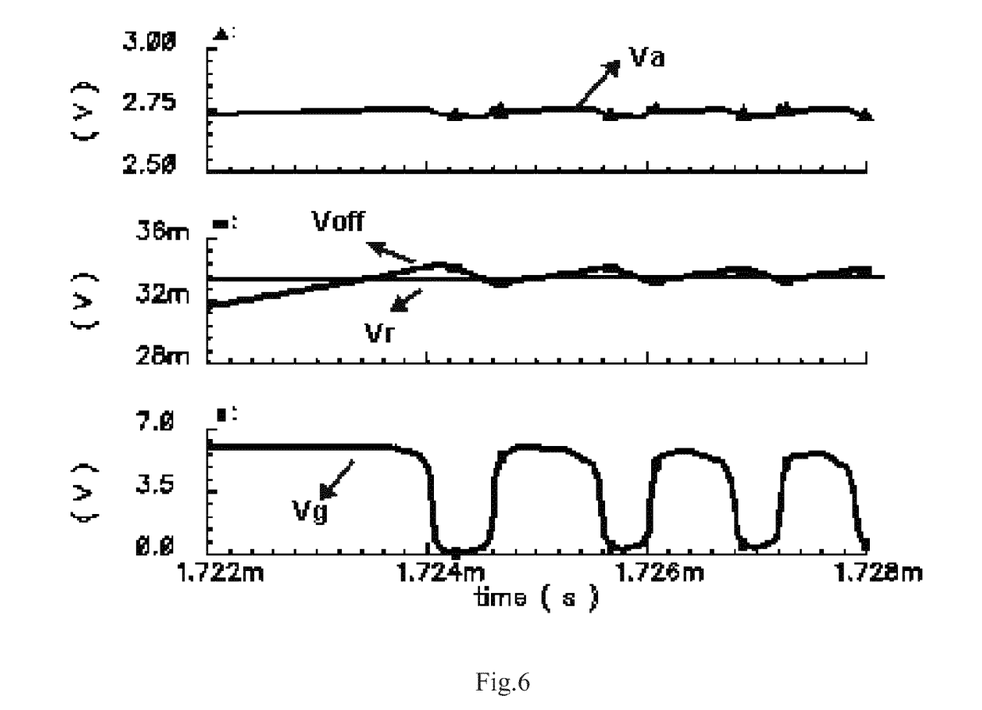
FIG. 6 shows the operation waveforms of the THD Reducer

THD reducer 407 is the key component to enable the system depicted in FIG. 3 built-in automatic THD optimization. The functional block diagram and operational principle of THD reducer 407 are illustrated in FIG. 5 and FIG. 6 respectively. THD reducer comprises a sampling module 501, double direction offset compensation voltage generating module 502, comparator 503 and logic control module 504. Wherein, the double direction offset compensation voltage generating module 502 further comprises a voltage-controlled voltage source 5021, a current source 5I1, a current sink 5I2 and a capacitor 5C1, wherein, the current source 5I1 and the current sink 5I2 are connected in series, and the second capacitor 5C1 and the current sink 5I2 are connected in parallel.

THD reducer 407 receives output Mo+Voff1 from multiplier 402, and samples output detuning voltage signal Voff1 when the multiplier receives a zero input via the sampling module 501. The double direction offset compensation voltage generating module 502 receives two opposite voltage signals VH and VL from logic control module 504, and controls the current source 5I1 and current sink 5I2 to discharge and charge the capacitor 5C1 to generate an offset voltage signal Va. The voltage-controlled voltage source 5021 receives a difference (such as but not limited to 2.5V, one skilled in the art can set such difference according to actual requirement) between the offset voltage signal Va and a fixed voltage signal Vb, and generates a double direction offset voltage signal Voff2 as the output of the THD reducer. The comparator 503 receives a summation Voff of the output Voff1 from the sampling module 501 and the double direction offset voltage signal Voff2 from the double direction offset compensation voltage generating module 502, and compares the summation Voff with the THD optimization set offset voltage Vr to generate a logic signal Vg. The logic control module 504 receives the logic signal Vg outputted by the comparator 503 to generate the two opposite voltage signals VH and VL. The double direction offset voltage signal Voff2 from the double direction offset compensation voltage generating module 502 is determined by the feedback loop of the THD optimization module, that is, the THD reducer 407. Referring to FIG. 6, the work process is listed as follows.

When the summation Voff is higher than the THD optimization set offset voltage Vr, logic signal Vg outputted by the comparator 503 is a logic low signal. Two opposite voltage signals VH and VL are generated by the logic control module 504, wherein, voltage signal VH switches off current source 5I1 and voltage signal VL switches on the current sink 5I2 to discharge the capacitor 5C1, in such a way that the offset voltage signal Va is adjusted to lower than the fixed voltage signal Vb. Then the feedback control can be realized via reducing the double direction offset voltage signal Voff2 from the double direction offset compensation voltage generating module 502 by the control of the voltage-controlled voltage source 5021. When the summation Voff is lower than the THD optimization set offset voltage Vr, logic signal Vg outputted by the comparator 503 is a logic high signal. At this time, voltage signal VH switches on current source 5I1 and voltage signal VL switches off the current sink 5I2 to charge the capacitor 5C1, in such a way that the offset voltage signal Va is adjusted to higher than the fixed voltage signal Vb. Then the summation Voff is enabled to accord with the THD optimization set offset voltage Vr or fluctuate slightly near the THD optimization set offset voltage Vr via increasing the double direction offset voltage signal Voff2 from the double direction offset compensation voltage generating module 502 by the control of the voltage-controlled voltage source 5021. In this way, the double direction offset voltage signal Voff2 can be represented as Vr−Voff1, and then the summation of the output detuning voltage Voff1 from multiplier and double direction offset voltage signal Voff2 from THD reducer, that is, the THD optimization set offset voltage Vr will never change with process variations and matching detuning while obtain high consistency.

The summation Mo+Cr of the outputs from the THD reducer and multiplier produces a sinusoidal reference signal for comparator 403 which is used to set the off period of power switch tube 3NMOS such that the residual voltage across the capacitor 3C1 after the bridge rectifier is eliminated, crossover distortion is decreased and THD optimization is achieved.

Figure 7A:
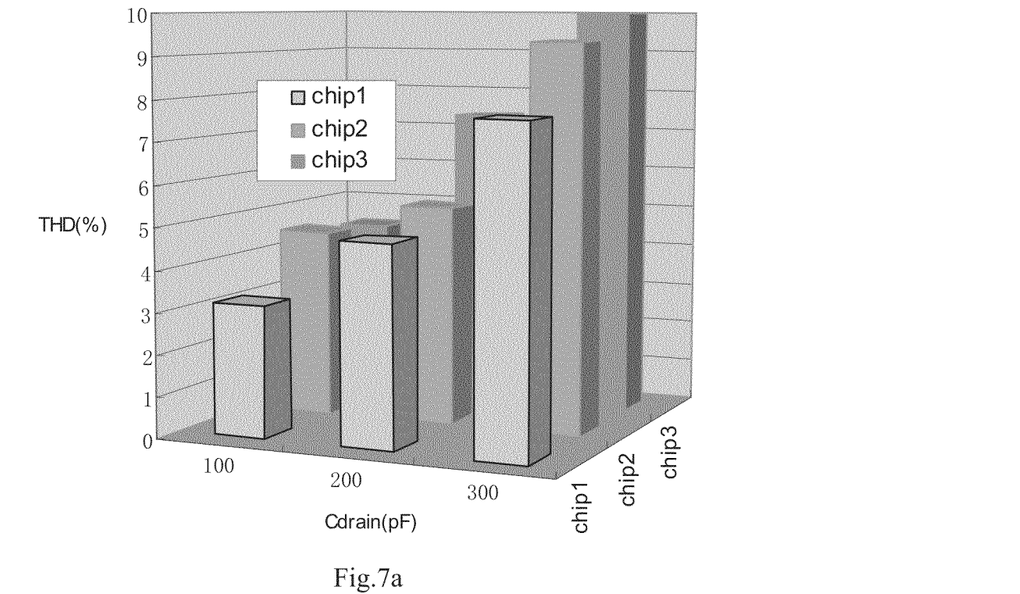
FIG. 7a shows the THD value for the prior-art PFC of FIG. 1 with differing input voltages Vin and equivalent parasitic capacitance.
Figure 7B:
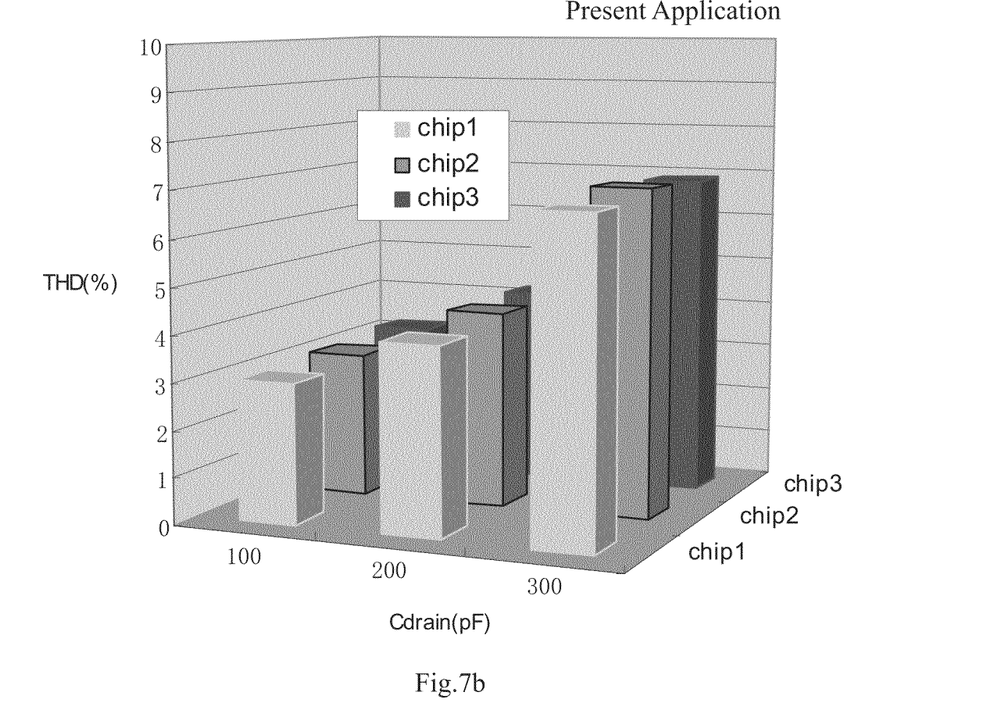
FIG. 7b shows the THD value for the present invention PFC of FIG. 3 with differing input voltages Vin and equivalent parasitic capacitance.

FIGS. 7a and 7b show the THD value for the prior-art PFC of FIG. 1 and the present invention PFC of FIG. 3 with differing input voltages, equivalent parasitic capacitances and chips. For the circuit depicted in FIG. 1, different chips have large differentia between their THD optimization values due to the affect of internal process variations and detuning. However, for the circuit depicted in FIG. 3 of present application, its built-in system can overcome the affect of internal process variations and detuning, set appropriate fixed offset voltage for THD optimization with better effect, have substantially consistent THD optimization result between different chips and be propitious to production.

Although the present invention is explained by specific embodiments, one skilled in the art should understand that various modifications and equivalents can be made to this invention without departing the scope of the present invention. Accordingly, the present invention is not limited to the disclosed specific embodiments while falls into all the implementations in the scope of the claims of the present invention.

What is claimed is:

1. A power factor correction device comprising a converter and a controller coupled to the converter to obtain an input voltage, wherein, the controller comprises a total harmonic distortion (THD) reducer capable of achieving an automatic THD optimization, the converter comprises an input current sense resistor, a power switch tube and an output circuit, wherein, the current sense resistor, power switch tube and output circuit form a feedback control loop to maintain an output voltage level;

wherein, the converter further comprises:
a bridge rectifier connected to an AC line voltage to have a rectified sinusoidal voltage,
a rectified main voltage divider connected to the bridge rectifier to scale down the rectified sinusoidal voltage such that a scale-down rectified sinusoidal voltage provided to the controller;
wherein, an anode of the output diode is connected to a drain of the power switch tube, and a cathode of the output diode is connected to the output voltage divider to scale down an output voltage and provide a scale-down output voltage to the controller, and the output filtering capacitor is connected with the rectified main voltage divider in parallel to filter high frequency components of the rectified sinusoidal voltage and store an DC output voltage;

wherein, the converter further comprises:
a first capacitor connected with the rectified main voltage divider in parallel to filter high frequency components of the rectified sinusoidal voltage; and
a boost inductor including an auxiliary winding and a primary winding, wherein a first terminal of the auxiliary winding is connected to the controller and a second terminal of the auxiliary winding is grounded, a first terminal of the primary winding is connected to an output end of the bridge rectifier, and a second terminal of the primary winding is connected to the drain of the power switch tube;

wherein, the controller comprises:

an error amplifier for generating a voltage error signal corresponding to a deviation between the scale-down output voltage and a predetermined reference voltage;

a multiplier for combining the scale-down rectified sinusoidal voltage with an output voltage error signal to generate a sinusoidal reference signal;

a comparator for generating a logic signal for setting the power switch tube on period by comparing a received current sense signal received by the input current sense resistor with the sinusoidal reference signal;

a zero crossing detector for generating an edge logic signal to turn on the power switch tube;

a RS flip-flop register and a gate driver combined to create a required analog waveform pattern for driving the power switch tube and thereby approximating a shape of a current running through the boost inductor to a sinusoidal waveform of the rectified sinusoidal voltage a THD Reducer for setting a THD optimization set offset voltage never changing with process variations via feedback control so as to minimize remain charges on the first capacitor at a valley of the rectified sinusoidal voltage;

wherein, the THD Reducer further comprises:

a sampling module for sampling output detuning voltage signal when the multiplier receives a zero input;

a double direction offset compensation voltage generating module for receiving two opposite voltage signals generated by a logic control module to generate a double direction offset voltage signal;

a comparator for generating a logic signal by comparing a summation of the output detuning voltage signal from the sampling module and the double direction offset voltage signal with the THD optimization set offset voltage; and wherein the logic control module is used for generating the two opposite voltage signals based on receiving the logic signal outputted by the comparator.

2. The power factor correction device according to claim 1, wherein, the double direction offset compensation voltage generating module further comprises a voltage-controlled voltage source, a current source, a current sink and a second capacitor, wherein, the current source and the current sink are connected in series, the second capacitor and the current sink are connected in parallel, wherein, the two opposite voltage signals control the current source and the current sink to charge or discharge the second capacitor for generating an offset voltage signal. The voltage-controlled voltage source receives the offset voltage signal and a fixed voltage signal to generate the double direction offset voltage signal.

3. A controller capable of obtaining automatic total harmonic distortion (THD) optimization used by a power factor correction device comprising:

an error amplifier for generating a voltage error signal corresponding to a deviation between the scale-down output voltage and a predetermined reference voltage;

a multiplier for combining the scale-down rectified sinusoidal voltage with an output voltage error signal to generate a sinusoidal reference signal;

a comparator for generating a logic signal for setting the power switch tube on period by comparing a received current sense signal received by the input current sense resistor with the sinusoidal reference signal;

a zero crossing detector for generating an edge logic signal to turn on the power switch tube;

a RS flip-flop register and a gate driver combined to create a required analog waveform pattern for driving the power switch tube and thereby approximating a shape of a current running through the boost inductor to a sinusoidal waveform of the rectified sinusoidal voltage a THD Reducer for setting a THD optimization set offset voltage never changing with process variations via feedback control so as to minimize remain charges on the first capacitor at a valley of the rectified sinusoidal voltage;

wherein, the THD Reducer further comprises:

a sampling module for sampling output detuning voltage signal when the multiplier receives a zero input;

a double direction offset compensation voltage generating module for receiving two opposite voltage signals generated by a logic control module to generate a double direction offset voltage signal;

a comparator for generating a logic signal by comparing a summation of the output detuning voltage signal from the sampling module and the double direction offset voltage signal with the THD optimization set offset voltage; and wherein the logic control module is used for generating the two opposite voltage signals based on receiving the logic signal outputted by the comparator.

4. A total harmonic distortion (THD) reducer capable of obtaining automatic THD optimization used by a power factor correction device comprising:

a sampling module for sampling output detuning voltage signal when a multiplier receives a zero input;

a double direction offset compensation voltage generating module for receiving two opposite voltage signals generated by a logic control module to generate a double direction offset voltage signal;

a comparator for generating a logic signal by comparing a summation of the output detuning voltage signal from the sampling module and the double direction offset voltage signal with a THD optimization set offset voltage; and wherein the logic control module is used for generating the two opposite voltage signals based on receiving the logic signal outputted by the comparator.

* * * * *